No. 673,087. Patented Apr. 30, 1901.
F. J. RABBETH.
GUARD FOR TROLLING HOOKS.
(Application filed Nov. 17, 1898.)
(No Model.)
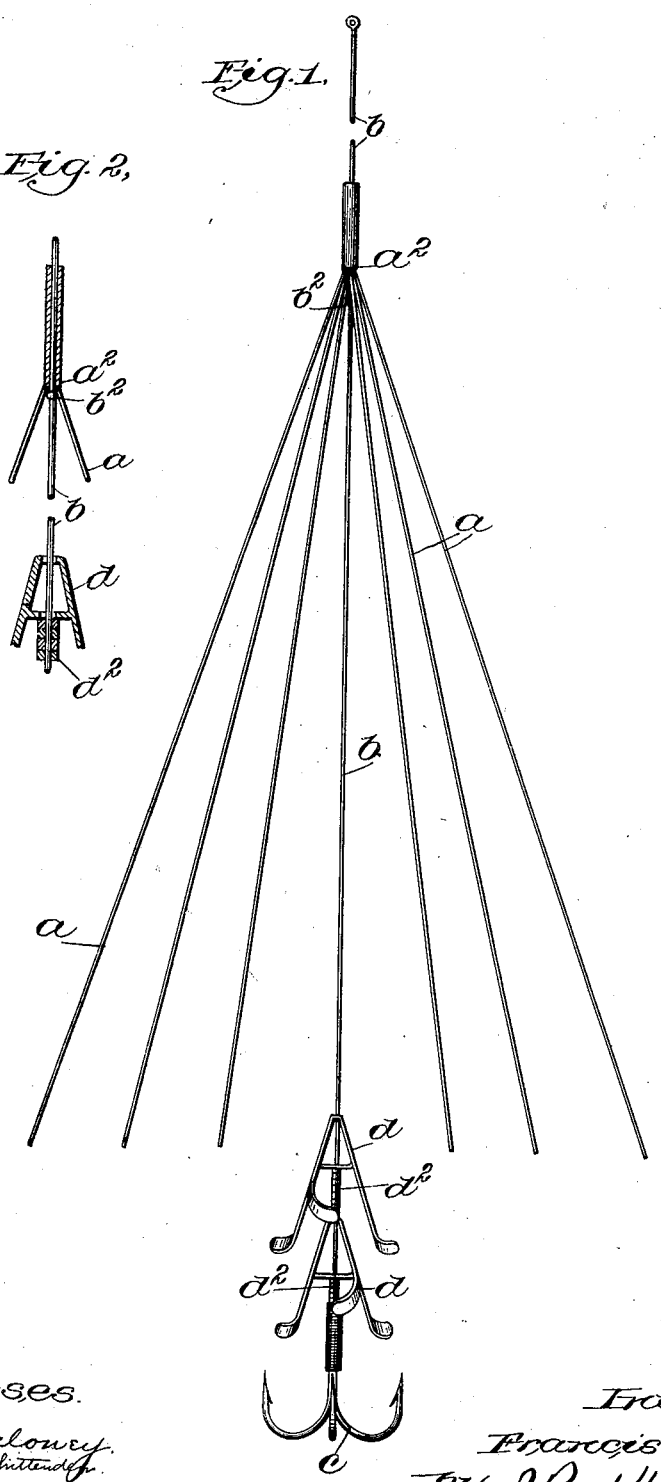

UNITED STATES PATENT OFFICE.

FRANCIS J. RABBETH, OF BOSTON, MASSACHUSETTS.

GUARD FOR TROLLING-HOOKS.

SPECIFICATION forming part of Letters Patent No. 673,087, dated April 30, 1901.

Application filed November 17, 1898. Serial No. 696,682. (No model.)

*To all whom it may concern:*

Be it known that I, FRANCIS J. RABBETH, of Boston, county of Suffolk, and State of Massachusetts, have invented an Improvement in Guards for Trolling-Hooks, of which the following description, in connection with the accompanying drawings, is a specification, like letters on the drawings representing like parts.

The present invention relates to a trolling device, the object being to guard the hook against being snagged on objects such as eelgrass, lily-pads, or snags when trolling for fish in waters where such obstructions are encountered. For this purpose the invention is embodied in a reed or grass guard adapted to be connected with the line or leader at some distance above the hook, the said guard having a number of radially-spreading members inclined away from the line or leader and extending toward the hook. When a spoon or spinner is used instead of bait, said spoon or spinner may be mounted to rotate above the hook, and a steel-wire leader is preferably employed, and the guard may be connected with said leader, while the spoon or spinner may be arranged to rotate around the same. It is desirable, moreover, that the spoon or spinner should be longitudinally movable, so as to slide out of the way after a fish takes the hook, and the guard itself may also be longitudinally movable, although this is obviously not essential.

The guard members are preferably made of wire connected together at one end, where they connect with the line or leader, the said members being sufficiently flexible to avoid unduly retarding the passage of the device through the water and at the same time spreading sufficiently to leave the hook accessible to the fish and not being sufficiently conspicuous to detract from the alluring effect of the bait or spinner.

Figure 1 is an elevation of a hook and line or leader having the guard embodying the invention applied thereto; and Fig. 2 is a sectional detail, on a somewhat-larger scale, showing the preferred construction when the device is to be used with a spoon or spinner.

The guard comprises a number of depending radially or divergently arranged members $a$, such as wires, connected together at $a^2$, the part $a^2$ being adapted to be suitably connected to the line or leader $b$ at some distance above the hook $c$. As herein shown, the device is applied to a leader provided with one or more spinners $d$, shown as adapted to freely rotate upon the leader $b$ and to be capable of sliding along the same, so as to move out of the way when a fish takes the hook. It is also desirable that the guard should be capable of moving out of the way, although it is necessary that the said guard should be retained at some distance beyond the hook, so as to protect the same without interfering with the use of the same. To this end the guard is herein shown as applied to a leader of considerable length, and the connecting portion $a^2$ has a longitudinal bore capable of sliding along said leader, which leader, however, is provided with a stop $b^2$ of sufficient size to prevent the guard from moving toward the hook beyond a certain definite point.

The spinners, which are shown as rotatable around the leader and separated from the hook and from each other by beads $d^2$, may in this instance be provided with openings large enough to pass over the stop $b^2$, so that when a fish is on the hook the spinners and guard are capable of moving along a considerable distance from the hook, so as to be entirely out of the way.

While the construction herein shown is practicable and in many instances desirable, it is not intended to limit the invention to such specific construction, since the guard may obviously be used without the leader, and any suitable means for fastening the guard to the rest of the tackle may be employed.

I claim—

1. The herein-described guard for a trolling-hook which consists of a number of radial guard members adapted to be connected with the line or leader at some distance from the hook, said members being inclined away from the line or leader and surrounding but not engaging the hook, substantially as described.

2. The combination with a line or leader provided with a hook, of a guard for said hook consisting of a number of guard members connected together at one end and spreading radially, an opening where said members are connected to receive said leader whereby the said guard is longitudinally movable along said leader, and means for preventing the said guard from moving along said leader toward the hook beyond a certain point, substantially as described.

3. The herein-described trolling device which comprises a leader provided with a hook and spinner, and guards connected with said leader above the hook and inclined away from said leader, to thereby protect the said hook and spinner, substantially as described.

4. A fish-hook gang comprising separable parts and a reed or grass guard on one of said parts and comprising a plurality of depending divergently-arranged yielding wires surrounding the part supporting the same.

5. A fish-hook gang comprising separable parts and including a wire strand, a sleeve freely movable on the said strand and having a series of depending divergently-arranged spring-wire extremities, and means for limiting the downward movement of the said sleeve and wire extremities.

In testimony whereof I have signed my name to this specification in the presence of two subscribing witnesses.

FRANCIS J. RABBETH.

Witnesses:
HENRY J. LIVERMORE,
NANCY P. FORD.